(12) United States Patent
Fama et al.

(10) Patent No.: US 8,131,578 B2
(45) Date of Patent: Mar. 6, 2012

(54) SYSTEMS AND METHODS FOR AUTOMATIC SCHEDULING OF A WORKFORCE

(75) Inventors: Jason Fama, Foster City, CA (US); Uri Peleg, Santa Clara, CA (US); Michael R. Bourke, Jr., San Francisco, CA (US); Richard M. Lawrence, Bainbridge Island, WA (US); Sameet Vasant Joshi, Palo Alto, CA (US)

(73) Assignee: Verint Americas Inc., Melville, NY (US)

( * ) Notice: Subject to any disclaimer, the term of this patent is extended or adjusted under 35 U.S.C. 154(b) by 1521 days.

(21) Appl. No.: 11/478,714

(22) Filed: Jun. 30, 2006

(65) Prior Publication Data

US 2008/0004934 A1    Jan. 3, 2008

(51) Int. Cl.
*G06Q 10/00* (2006.01)
(52) U.S. Cl. ...................................................... 705/7.13
(58) Field of Classification Search .................. 705/7.13
See application file for complete search history.

(56) References Cited

U.S. PATENT DOCUMENTS

| | | | |
|---|---|---|---|
| 3,594,919 | A | 7/1971 | De Bell et al. |
| 3,705,271 | A | 12/1972 | De Bell et al. |
| 4,510,351 | A | 4/1985 | Costello et al. |

(Continued)

FOREIGN PATENT DOCUMENTS

EP    0453128 A2    10/1991

(Continued)

OTHER PUBLICATIONS

IEX, "TotalView WebStation Guide" 2004.*

(Continued)

*Primary Examiner* — Lynda Jasmin
*Assistant Examiner* — George H Walker, III

(57) ABSTRACT

Systems and methods are disclosed for scheduling a workforce. In one embodiment, the method comprises the steps of: receiving a shift activity template; receiving an association between the shift activity template and at least one worker; and scheduling a plurality of schedulable objects. The scheduling is performed in accordance with a workload forecast and schedule constraints. Each of the schedulable objects is based on the shift activity template. The shift activity template describes a worker activity performed during a shift. The template has range of start times and a variable length for the activity. The activity is associated with a queue.

20 Claims, 12 Drawing Sheets

| VL Activity Template 230 | |
|---|---|
| Activity | 410 |
| Lunch/Break/Training/ SalesQueue/ SupportQueue | |
| Queue(s) | 420 |
| StartType | 430 |
| Any/Relative/Absolute | |
| StartTime [Range] | 440 |
| Period | 450 |
| Count [Range] | 460 |
| Duration [Range] | 470 |

U.S. PATENT DOCUMENTS

| | | | |
|---|---|---|---|
| 4,684,349 A | 8/1987 | Ferguson et al. | |
| 4,694,483 A | 9/1987 | Cheung | |
| 4,763,353 A | 8/1988 | Canale et al. | |
| 4,815,120 A | 3/1989 | Kosich | |
| 4,924,488 A | 5/1990 | Kosich | |
| 4,953,159 A | 8/1990 | Hayden et al. | |
| 5,016,272 A | 5/1991 | Stubbs et al. | |
| 5,101,402 A | 3/1992 | Chiu et al. | |
| 5,117,225 A | 5/1992 | Wang | |
| 5,210,789 A | 5/1993 | Jeffus et al. | |
| 5,239,460 A | 8/1993 | LaRoche | |
| 5,241,625 A | 8/1993 | Epard et al. | |
| 5,267,865 A | 12/1993 | Lee et al. | |
| 5,299,260 A | 3/1994 | Shaio | |
| 5,311,422 A | 5/1994 | Loftin et al. | |
| 5,315,711 A | 5/1994 | Barone et al. | |
| 5,317,628 A | 5/1994 | Misholi et al. | |
| 5,325,292 A * | 6/1994 | Crockett | 705/7.18 |
| 5,347,306 A | 9/1994 | Nitta | |
| 5,388,252 A | 2/1995 | Dreste et al. | |
| 5,396,371 A | 3/1995 | Henits et al. | |
| 5,432,715 A | 7/1995 | Shigematsu et al. | |
| 5,465,286 A | 11/1995 | Clare et al. | |
| 5,475,625 A | 12/1995 | Glaschick | |
| 5,485,569 A | 1/1996 | Goldman et al. | |
| 5,491,780 A | 2/1996 | Fyles et al. | |
| 5,499,291 A | 3/1996 | Kepley | |
| 5,535,256 A | 7/1996 | Maloney et al. | |
| 5,572,652 A | 11/1996 | Robusto et al. | |
| 5,577,112 A | 11/1996 | Cambray et al. | |
| 5,590,171 A | 12/1996 | Howe et al. | |
| 5,597,312 A | 1/1997 | Bloom et al. | |
| 5,619,183 A | 4/1997 | Ziegra et al. | |
| 5,696,906 A | 12/1997 | Peters et al. | |
| 5,717,879 A | 2/1998 | Moran et al. | |
| 5,721,842 A | 2/1998 | Beasley et al. | |
| 5,742,670 A | 4/1998 | Bennett | |
| 5,748,499 A | 5/1998 | Trueblood | |
| 5,778,182 A | 7/1998 | Cathey et al. | |
| 5,784,452 A | 7/1998 | Carney | |
| 5,790,798 A | 8/1998 | Beckett, II et al. | |
| 5,796,952 A | 8/1998 | Davis et al. | |
| 5,809,247 A | 9/1998 | Richardson et al. | |
| 5,809,250 A | 9/1998 | Kisor | |
| 5,825,869 A | 10/1998 | Brooks et al. | |
| 5,835,572 A | 11/1998 | Richardson, Jr. et al. | |
| 5,862,330 A | 1/1999 | Anupam et al. | |
| 5,864,772 A | 1/1999 | Alvarado et al. | |
| 5,884,032 A | 3/1999 | Bateman et al. | |
| 5,907,680 A | 5/1999 | Nielsen | |
| 5,911,134 A | 6/1999 | Castonguay et al. | |
| 5,918,214 A | 6/1999 | Perkowski | |
| 5,923,746 A | 7/1999 | Baker et al. | |
| 5,933,811 A | 8/1999 | Angles et al. | |
| 5,944,791 A | 8/1999 | Scherpbier | |
| 5,948,061 A | 9/1999 | Merriman et al. | |
| 5,958,016 A | 9/1999 | Chang et al. | |
| 5,964,836 A | 10/1999 | Rowe et al. | |
| 5,978,648 A | 11/1999 | George et al. | |
| 5,982,857 A | 11/1999 | Brady | |
| 5,987,466 A | 11/1999 | Greer et al. | |
| 5,990,852 A | 11/1999 | Szamrej | |
| 5,991,373 A | 11/1999 | Pattison et al. | |
| 5,991,796 A | 11/1999 | Anupam et al. | |
| 6,005,932 A | 12/1999 | Bloom | |
| 6,009,429 A | 12/1999 | Greer et al. | |
| 6,014,134 A | 1/2000 | Bell et al. | |
| 6,014,647 A | 1/2000 | Nizzari et al. | |
| 6,018,619 A | 1/2000 | Allard et al. | |
| 6,035,332 A | 3/2000 | Ingrassia et al. | |
| 6,038,544 A | 3/2000 | Machin et al. | |
| 6,039,575 A | 3/2000 | L'Allier et al. | |
| 6,044,355 A * | 3/2000 | Crockett et al. | 705/7.39 |
| 6,057,841 A | 5/2000 | Thurlow et al. | |
| 6,058,163 A | 5/2000 | Pattison et al. | |
| 6,061,798 A | 5/2000 | Coley et al. | |
| 6,072,860 A | 6/2000 | Kek et al. | |
| 6,076,099 A | 6/2000 | Chen et al. | |
| 6,078,894 A | 6/2000 | Clawson et al. | |
| 6,091,712 A | 7/2000 | Pope et al. | |
| 6,108,711 A | 8/2000 | Beck et al. | |
| 6,122,665 A | 9/2000 | Bar et al. | |
| 6,122,668 A | 9/2000 | Teng et al. | |
| 6,130,668 A | 10/2000 | Stein | |
| 6,138,139 A | 10/2000 | Beck et al. | |
| 6,144,991 A | 11/2000 | England | |
| 6,146,148 A | 11/2000 | Stuppy | |
| 6,151,622 A | 11/2000 | Fraenkel et al. | |
| 6,154,771 A | 11/2000 | Rangan et al. | |
| 6,157,808 A | 12/2000 | Hollingsworth | |
| 6,171,109 B1 | 1/2001 | Ohsuga | |
| 6,182,094 B1 | 1/2001 | Humpleman et al. | |
| 6,195,679 B1 | 2/2001 | Bauersfeld et al. | |
| 6,201,948 B1 | 3/2001 | Cook et al. | |
| 6,211,451 B1 | 4/2001 | Tohgi et al. | |
| 6,225,993 B1 | 5/2001 | Lindblad et al. | |
| 6,230,197 B1 | 5/2001 | Beck et al. | |
| 6,236,977 B1 | 5/2001 | Verba et al. | |
| 6,244,758 B1 | 6/2001 | Solymar et al. | |
| 6,282,548 B1 | 8/2001 | Burner et al. | |
| 6,286,030 B1 | 9/2001 | Wenig et al. | |
| 6,286,046 B1 | 9/2001 | Bryant | |
| 6,288,753 B1 | 9/2001 | DeNicola et al. | |
| 6,289,340 B1 | 9/2001 | Puram et al. | |
| 6,301,462 B1 | 10/2001 | Freeman et al. | |
| 6,301,573 B1 | 10/2001 | McIlwaine et al. | |
| 6,324,282 B1 | 11/2001 | McIlwaine et al. | |
| 6,347,374 B1 | 2/2002 | Drake et al. | |
| 6,351,467 B1 | 2/2002 | Dillon | |
| 6,353,851 B1 | 3/2002 | Anupam et al. | |
| 6,360,250 B1 | 3/2002 | Anupam et al. | |
| 6,370,574 B1 | 4/2002 | House et al. | |
| 6,404,857 B1 | 6/2002 | Blair et al. | |
| 6,411,989 B1 | 6/2002 | Anupam et al. | |
| 6,415,259 B1 | 7/2002 | Wolfinger et al. | |
| 6,418,471 B1 | 7/2002 | Shelton et al. | |
| 6,459,787 B2 | 10/2002 | McIlwaine et al. | |
| 6,487,195 B1 | 11/2002 | Choung et al. | |
| 6,493,758 B1 | 12/2002 | McLain | |
| 6,502,131 B1 | 12/2002 | Vaid et al. | |
| 6,510,220 B1 | 1/2003 | Beckett, II et al. | |
| 6,535,909 B1 | 3/2003 | Rust | |
| 6,542,602 B1 | 4/2003 | Elazar | |
| 6,546,405 B2 | 4/2003 | Gupta et al. | |
| 6,560,328 B1 | 5/2003 | Bondarenko et al. | |
| 6,583,806 B2 | 6/2003 | Ludwig et al. | |
| 6,606,657 B1 | 8/2003 | Zilberstein et al. | |
| 6,628,777 B1 * | 9/2003 | McIlwaine et al. | 379/265.01 |
| 6,665,644 B1 | 12/2003 | Kanevsky et al. | |
| 6,674,447 B1 | 1/2004 | Chiang et al. | |
| 6,683,633 B2 | 1/2004 | Holtzblatt et al. | |
| 6,697,858 B1 | 2/2004 | Ezerzer et al. | |
| 6,724,887 B1 | 4/2004 | Eilbacher et al. | |
| 6,738,456 B2 | 5/2004 | Wrona et al. | |
| 6,757,361 B2 | 6/2004 | Blair et al. | |
| 6,772,396 B1 | 8/2004 | Cronin et al. | |
| 6,775,377 B2 | 8/2004 | McIlwaine et al. | |
| 6,792,575 B1 | 9/2004 | Samaniego et al. | |
| 6,810,414 B1 | 10/2004 | Brittain | |
| 6,820,083 B1 | 11/2004 | Nagy et al. | |
| 6,823,384 B1 | 11/2004 | Wilson et al. | |
| 6,870,916 B2 | 3/2005 | Henrikson et al. | |
| 6,901,438 B1 | 5/2005 | Davis et al. | |
| 6,959,078 B1 | 10/2005 | Eilbacher et al. | |
| 6,965,886 B2 | 11/2005 | Govrin et al. | |
| 6,970,829 B1 * | 11/2005 | Leamon | 705/7.14 |
| 7,650,293 B2 | 1/2010 | Kiran et al. | |
| 2001/0000962 A1 | 5/2001 | Rajan | |
| 2001/0032335 A1 | 10/2001 | Jones | |
| 2001/0043697 A1 | 11/2001 | Cox et al. | |
| 2002/0023157 A1 | 2/2002 | Lo et al. | |
| 2002/0038363 A1 | 3/2002 | MacLean | |
| 2002/0052948 A1 | 5/2002 | Baudu et al. | |
| 2002/0065911 A1 | 5/2002 | Von Klopp et al. | |
| 2002/0065912 A1 | 5/2002 | Catchpole et al. | |
| 2002/0128925 A1 | 9/2002 | Angeles | |
| 2002/0143925 A1 | 10/2002 | Pricer et al. | |

| | | | |
|---|---|---|---|
| 2002/0165954 | A1 | 11/2002 | Eshghi et al. |
| 2003/0055883 | A1 | 3/2003 | Wiles et al. |
| 2003/0079020 | A1 | 4/2003 | Gourraud et al. |
| 2003/0144900 | A1 | 7/2003 | Whitmer |
| 2003/0154240 | A1 | 8/2003 | Nygren et al. |
| 2004/0100507 | A1 | 5/2004 | Hayner et al. |
| 2004/0165717 | A1 | 8/2004 | McIlwaine et al. |
| 2004/0193472 | A1* | 9/2004 | Ramakrishnan et al. .......... 705/9 |
| 2004/0193473 | A1 | 9/2004 | Robertson et al. |
| 2004/0193972 | A1 | 9/2004 | Mitlin et al. |
| 2004/0267591 | A1* | 12/2004 | Hedlund et al. ................... 705/9 |
| 2004/0267595 | A1 | 12/2004 | Woodings et al. |
| 2005/0137925 | A1 | 6/2005 | Lakritz et al. |
| 2005/0138560 | A1 | 6/2005 | Lee et al. |
| 2006/0239440 | A1* | 10/2006 | Shaffer et al. ............ 379/265.02 |
| 2007/0050228 | A1 | 3/2007 | Beshears |
| 2007/0127690 | A1 | 6/2007 | Patakula et al. |
| 2007/0179829 | A1 | 8/2007 | Laperi et al. |

FOREIGN PATENT DOCUMENTS

| | | |
|---|---|---|
| EP | 0773687 A2 | 5/1997 |
| EP | 0989720 | 3/2000 |
| GB | 2369263 | 5/2002 |
| WO | WO 98/43380 | 11/1998 |
| WO | WO 00/16207 | 3/2000 |

OTHER PUBLICATIONS

Klungle, Roger ("Simulation of a Claims Call Center: A Success and a Failure," Proceedings of the 1999 Winter Simulation Conference, vol. 2, pp. 1648-1653, Dec. 5-8, 1999, ISBN: 0-7803-5780-9).*

Communitywfm.com Symon's "Community" software website Aug. 2003, downloaded from web.archive.org.*

Gans, Noah; Koole, Ger; Mandelbaum, Avishai, "Telephone Call Centers: Tutorial, Review, and Research Prospects," Manufacturing Service Operations Management Spring 2003, vol. 5: 79-141, 1526-5498 electronic ISSN.*

Wallace, Rodney B.; Whitt, Ward, "A Staffing Algorithm for Call Centers with Skill-Based Routing," Manufacturing Service Operations Management Fall 2005, vol. 7, No. 4: 276-294, 1526-5498 electronic ISSN.*

"New Adaptiv WorkFORCE/Call Center Edition Software Can Schedule by Skill, Automatically—Budgets, Benefits, Rules All Present and Accounted for, Too" from internet site located at http://findarticles.com/p/articles/mi_m0EIN/is_1998_Oct_19/ai_53094247, retrieved on Sep. 9, 2008, 5 pages.

Wittwer, John, "How to Create a Timeline in Excel", retrieved from URL: http://www.vertex42.com/ExcelArticles/create-a-timeline.html, Feb. 9, 2005, 4 pages.

Jim Quiggins, et al., "A New Approach to Contact Center Optimization", IEX Corporation, Jun. 21, 2004, 11 pages.

Ger Koole, et al., "Queuing Models of Call Centers: An Introduction", Annals of Operations Research, vol. 113, pp. 41-59, Jul. 2002, ISSN 0254-5330 (Print) 1572-9338 (Online), 18 pages.

IEX Web TotalView Overview download from the Dec. 4, 2003, IEX Website via web.archive.org on Nov. 3, 2009, 2 pages.

* cited by examiner

| VL Activity Template 230 | |
|---|---|
| Activity 410 Lunch/Break/Training/ SalesQueue/ SupportQueue | |
| Queue(s) 420 | |
| StartType 430 Any/Relative/Absolute | |
| StartTime 440 [Range] | |
| Period 450 | |
| Count 460 [Range] | |
| Duration 470 [Range] | |

FIG. 4

SYSTEMS AND METHODS FOR AUTOMATIC SCHEDULING OF A WORKFORCE

FIELD OF THE DISCLOSURE

This application is related to commonly assigned application Ser. No. 11/396,063, entitled "Systems and Methods for Automatic Scheduling of a Workforce", filed Mar. 31, 2006.

BACKGROUND

Many of today's contact centers use skill-based routing, where contacts are queued and distributed to agents according to agent skills. In some skill-based routing environments, it is desirable to assign a multi-skilled agent to service all queues for which the agent has the appropriate skill. In other skill-based routing environments, it is desirable to assign a multi-skilled agent to service a specific queue, or queues, for which the agent has the appropriate skill.

The second option, called "queue hopping" is usually less efficient. However, there are a number of reasons why queue hopping might be appropriate for a call center. Some of the reasons include: the ability to track exact capacity for specific queues at specific times; scheduling solid blocks of scheduled time for particular queues reduces the cost of agent context switching among queues; limitations in contact routing technology or in workstation application software; and the ability to move low-skilled agents to an exceptionally high volume queue.

SUMMARY

Systems and methods are disclosed for scheduling a workforce. In one embodiment, the method comprises the steps of: receiving a shift activity template; receiving an association between the shift activity template and at least one worker; and scheduling a plurality of schedulable objects. The scheduling is performed in accordance with a workload forecast and schedule constraints. Each of the schedulable objects is based on the shift activity template. The shift activity template describes a worker activity performed during a shift. The template has range of start times and a variable length for the activity. The activity is associated with a queue.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

FIG. 4 is a block diagram showing one representation of a variable-length activity template (FIG. 2).

DETAILED DESCRIPTION

Figure 1:
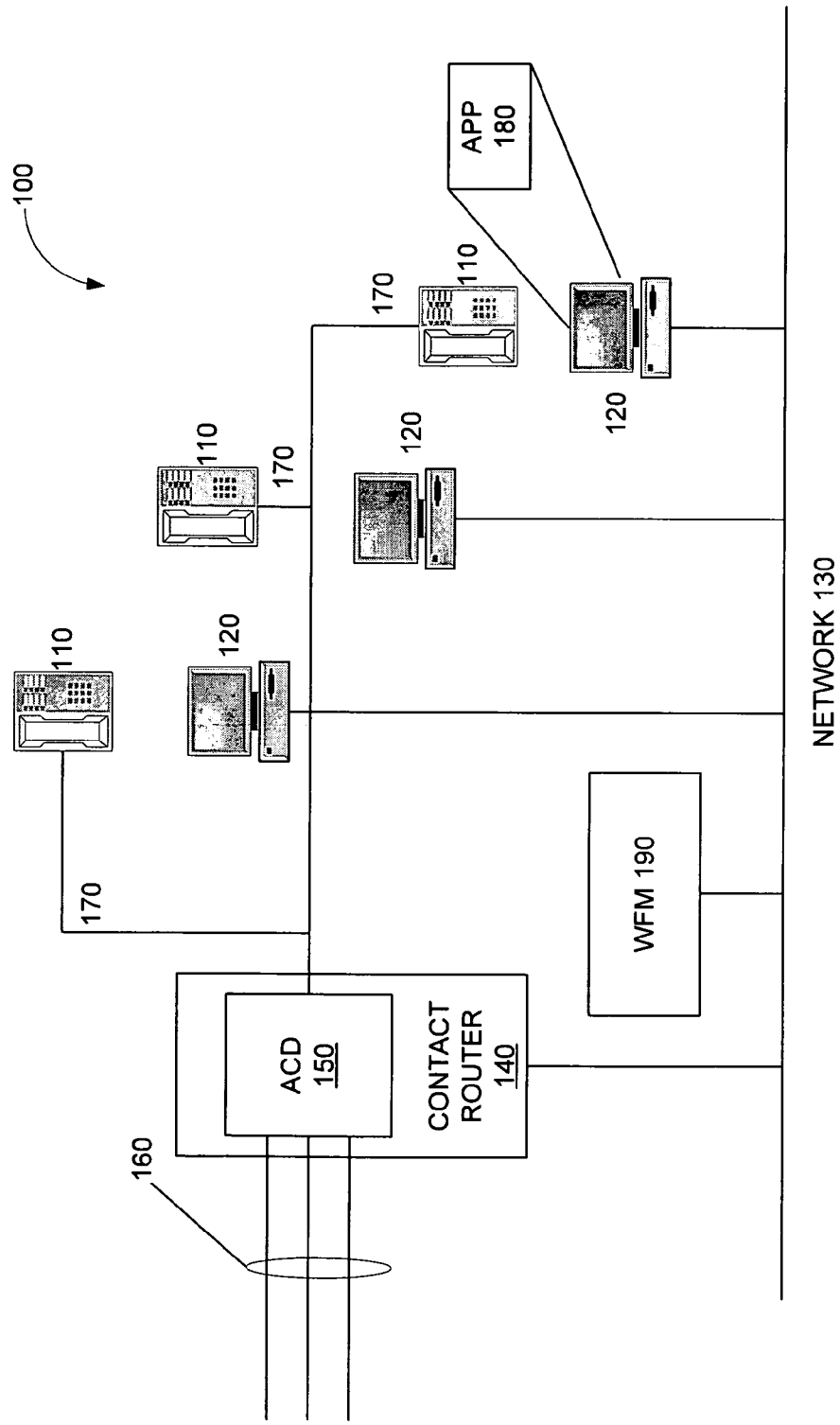
FIG. 1 is a block diagram of a contact center environment 100.

FIG. 1 is a block diagram of a contact center environment 100. Contact center 100 is staffed by agents who handle incoming and/or outgoing contacts. Although the traditional and most common form of contact is by phone, other types of contacts can be used, such as text chat, web collaboration, email, and fax. An agent workspace includes an agent phone 110 and a workstation computer 120. A network 130 connects one or more of the workstations 120.

A contact router 140 distributes or routes contacts (incoming or outgoing) to an agent position. Voice over Internet Protocol (VoIP) calls and computer-based contacts (e.g., chat, email) are routed over one or more data networks, and distributed over network 130 to one of the agent workstations 120. Contact router 140 may include an automatic call distributor (ACD) 150 to route phone contacts. The embodiments described herein will refer to ACD 150 instead of contact router 140, but analogous contact router actions and operations are intended to be captured by this disclosure. Note that a predictive dialer (not shown) could be used for directing outbound calls to agents for handling.

If an agent is not available to handle a particular call, ACD 150 puts the call into a queue, which effectively places the caller on hold. When an agent is available, ACD 150 connects the outside trunk line 160 carrying the phone call to the trunk line 170 of a selected agent.

When an agent is ready to handle contacts, the agent first logs into ACD 150. This login notifies ACD 150 hat the agent is available to take calls. An agent's ACD state changes throughout the workday, as the agent performs work activities such as handling calls, performing after-call work, and taking breaks. An example list of states includes available, busy, after-call work, and unavailable.

While handling a contact, the agent interacts with one or more applications 180 running on workstation 120. By way of example, workstation applications 180 could provide the agent with access to customer records, product information, ordering status, and transaction history. The applications 180 may access one or more business databases (not shown) via the network 130.

Contact center 100 also includes a work force management system (WFMS) 190. WFMS 190 performs many functions. One such function is providing a contact center supervisor or manager with information about agents and contacts, both historical and real-time. Another function is supplying the supervisor with information on how well each agent complies with contact center policies. Yet another function is calculating staffing levels and creating agent schedules based on historical patterns of incoming contacts. The functionality of the entire work force management system 190 is typically divided among several applications, some of which have a user interface component, and WFMS 190 comprises the suite of applications.

In the environment described above, the workers assigned to shifts are contact center agents. However, the scheduling methods and systems described herein are also applicable to scheduling other kinds of workers in other types of work environments. Therefore, the remaining embodiments will refer to workers rather than agents.

Figure 2:
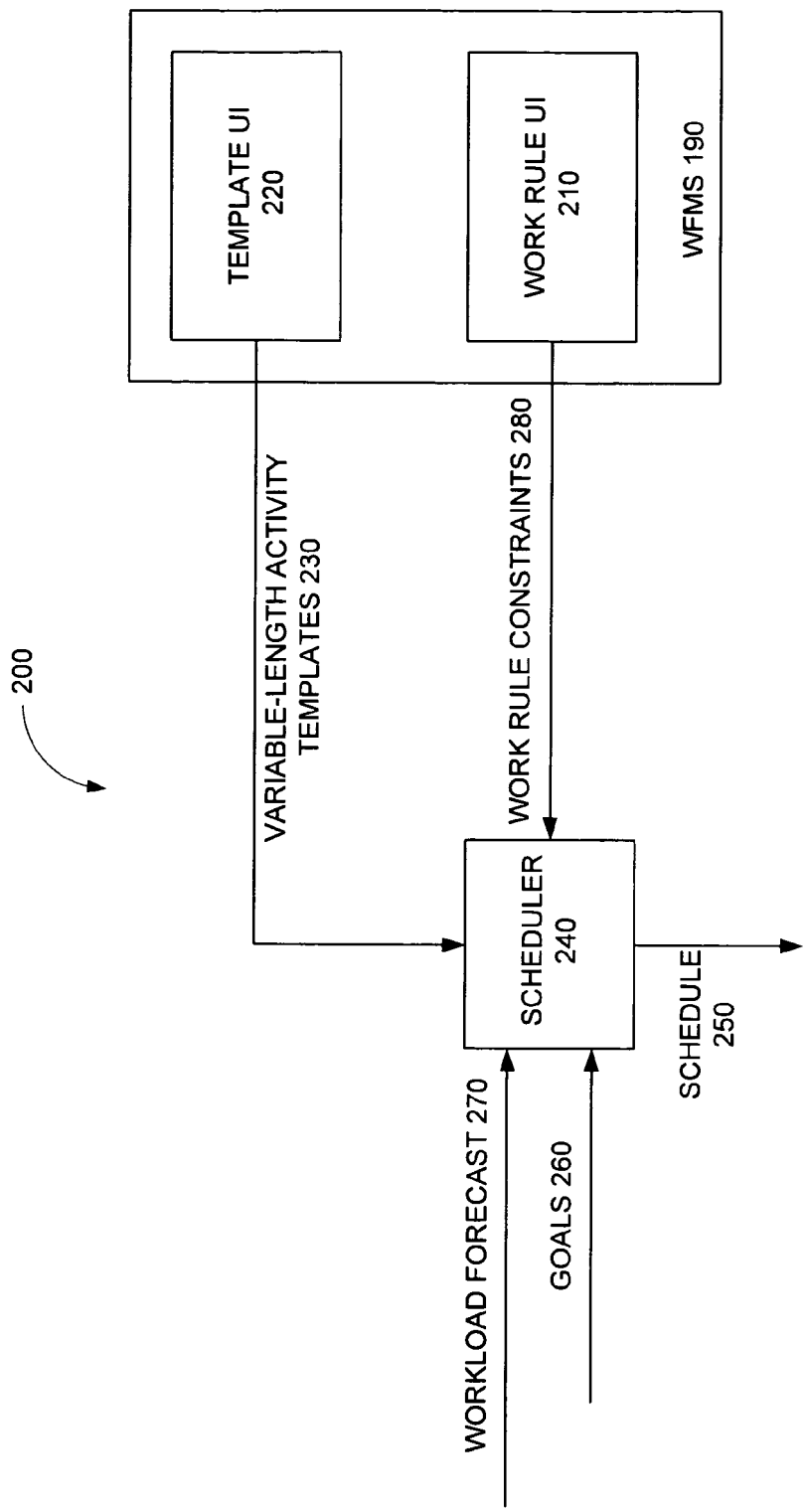
FIG. 2 is a dataflow diagram showing one embodiment of a system (200) for automatic scheduling of a workforce.

FIG. 2 is a dataflow diagram showing one embodiment of a system (200) for automatic scheduling of a workforce. A user interacts with a work-rule user interface component 210 of WFMS 190 to define work rules such as maximum shift length, allowable shift start times, and break requirements. A user also interacts with a template user interface component 220 to define one or more variable-length activity templates 230. A variable-length activity template 230 describes a worker activity that can vary in length. Although shown as two separate components in FIG. 2, in another embodiment the template user interface 220 and work-rule interface 230 are combined into a single user interface. Variable-length activity templates 230 are provided as input to a scheduler component 240, which produces a schedule 250 that attempts to optimize goals 260 while meeting a workload forecast 270 and a set of work rule constraints 280.

Figure 3:
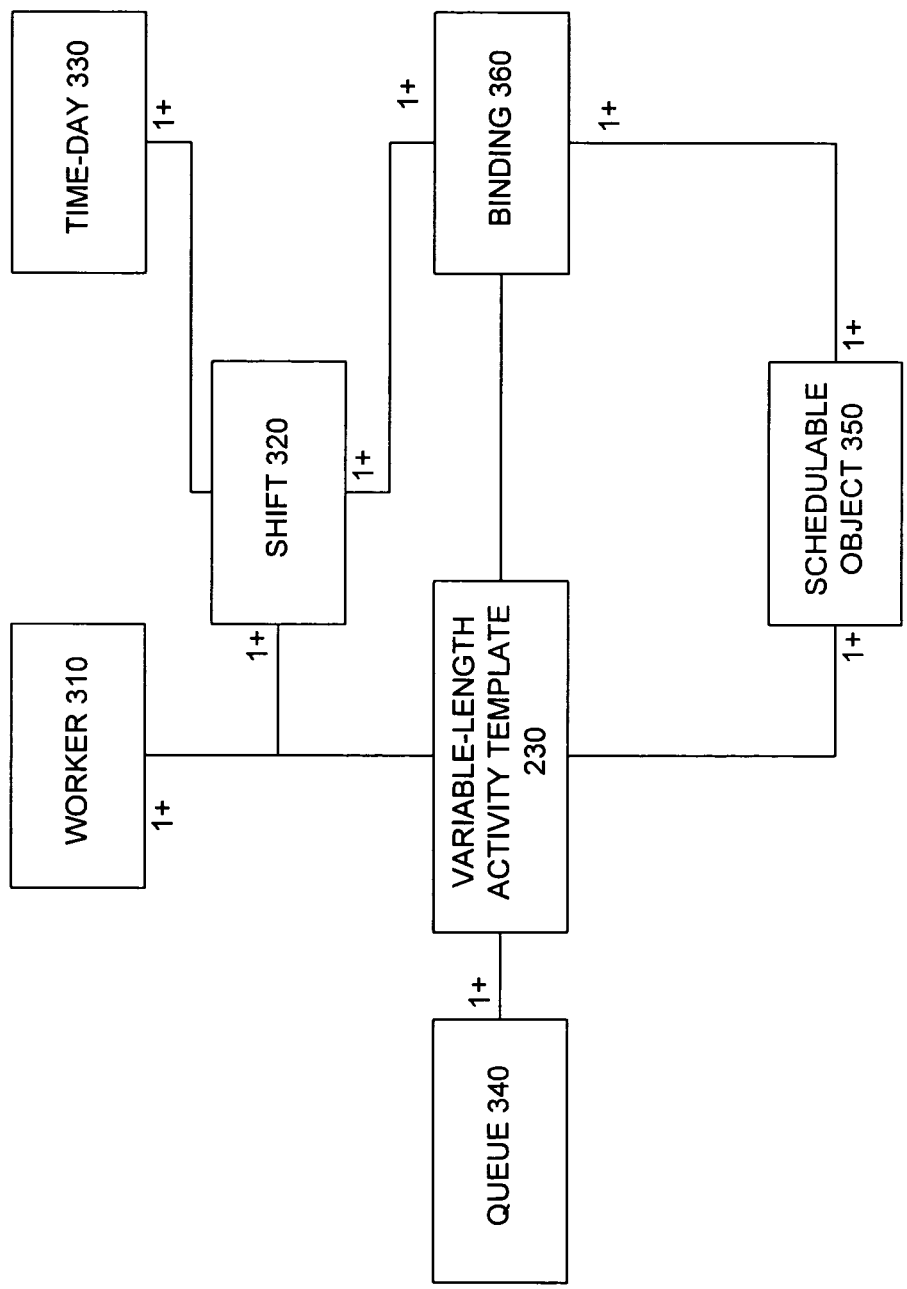
FIG. 3 shows a set of entities, or objects, and the interrelationships between them, used by one embodiment of a scheduler (FIG. 2) that supports automatic scheduling of a workforce.

FIG. 3 shows a set of entities, or objects, and the interrelationships between them, used by one embodiment of a scheduler 240 that supports automatic scheduling of a workforce. Each worker 310 is associated with one or mores shifts 320, where a shift 320 is described by a time range and a day (330). As can be seen in FIG. 3, a worker 310 can have more than one shift 320, and a time range-day 330 can be associated with more than one shift 320 (e.g., different workers). However, a particular shift 320 is specific to a worker and to a time range-day (e.g. a shift representing "John Doe on Monday 9 AM-5 PM").

A variable-length activity template 230, which is associated with at least one worker 310 and at least one shift 320, describes an activity related to servicing a particular contact router queue 340, and the allowable time slots during the shift 320 when the activity can be scheduled. The duration of the queue-specific activity is flexible rather than fixed. Scheduler 240 creates one or more schedulable objects 350 based on each template 230, such that attributes in a schedulable object 350 are initialized from corresponding attributes in the template 230. Each schedulable object 350 represents an instance of the template's activity which can be assigned somewhere during the shift 320.

Scheduler 240 also creates a set, or domain, of bindings 360 for each shift 320. A binding 360 represents a particular time slot in a shift 320. As can be seen in FIG. 3, a schedulable object 350 can possibly be bound to more than one binding 360. Scheduler 240 chooses one optimal binding 360 for each schedulable object 350. By selecting a binding for a schedulable object, scheduler 240, in effect, assigns the work activity for that one object (derived from a template) to the time slot specified in the binding. A person of ordinary skill in the art should be familiar with the concepts of schedulable objects, binding domains, and optimal binding.

As described earlier, the duration of the activity in template 230 is variable. Without a template for this variation, a contact center supervisor wishing to schedule variable-length queue-specific activities would need to define a large number of shifts (e.g., one shift for Q1 activity=1 hour and Q2 activity=4 hours, another shift for Q1 activity=2 hours and Q2 activity=4 hours, and yet another for Q1 activity=2 hours and Q2 activity=3 hours, etc.) The use of template 230 allows the supervisor to instead define a small number of variable-length activity templates 230 to capture the possible combinations of queue-specific activities with varying length. The scheduler 240 then uses the templates 230 to create a collection of objects 350 that, in conjunction with the set of bindings 360, represents this variation in duration. The variation in duration of schedulable objects 350 allows scheduler 240 to produce a more optimal schedule. The process of creating schedulable objects 350, creating bindings 360, and choosing optimal bindings will be discussed further in connection with FIGS. 5-7.

FIG. 4 is a block diagram showing one representation of a variable-length activity template 230. In this embodiment, variable-length activity template 230 includes the following attributes: an activity 410; one or more queues 420; a start type 430; a start time range 440; a period 450; a count 460; and a duration 470. Activity 410 represents the expected activity to be performed during the shift associated with this template 230. In one embodiment, activities 410 include non-work activities related to a shift such as lunch and break. In another embodiment, activity 410 is a work activity associated with a specific queue. In yet another embodiment, activity 410 can be either a shift activity or a queue-specific activity.

Start type 430 and start time 440 define a range of start times. If start type 430 is Absolute, start time 440 simply specifies a range of start times for activity 410 (e.g., 11:00 AM-12:00 PM). If start type 430 is Relative, then start time 440 specifies a range of start times for activity 410, and this range is relative to the start time of the shift associated with this template 230. For example, a relative start time 440 of 0:30-1:00, in combination with an associated shift having a start time of 9 AM, specifies that activity 410 can be scheduled to start between 9:30 AM and 10:00 AM.

The total length of time that this activity that can be scheduled, during the entire shift, is specified in one of two ways. Using the first mechanism, count 460 represents the number of periods that can be scheduled, each having length 450. Count 460 is expressed as a range (minimum/maximum). The activity can be scheduled as non-consecutive blocks within the shift. For example, a template with Count=1-4 and Period=0:30 can be used to schedule 1, 2, 3, or 4 half-hour blocks for the activity. The length of the activity is flexible, from 0:30 to 2:00, and so is the scheduling of the individual blocks within the shift.

Using the second mechanism, duration 470 specifies a range (minimum/maximum) of total activity time, where the granularity of the duration is period 450. The time for the activity is consecutive. For example, a template with Period=0:30 and Duration=0:30-2:00 can be used to schedule an activity having length 0:30, or an activity having length 1:00, or an activity having length 1:30, or an activity having length 2:00. The length of the activity is flexible, from 0:30 to 2:00, but the activity is scheduled as a single block within the shift.

Figure 5:
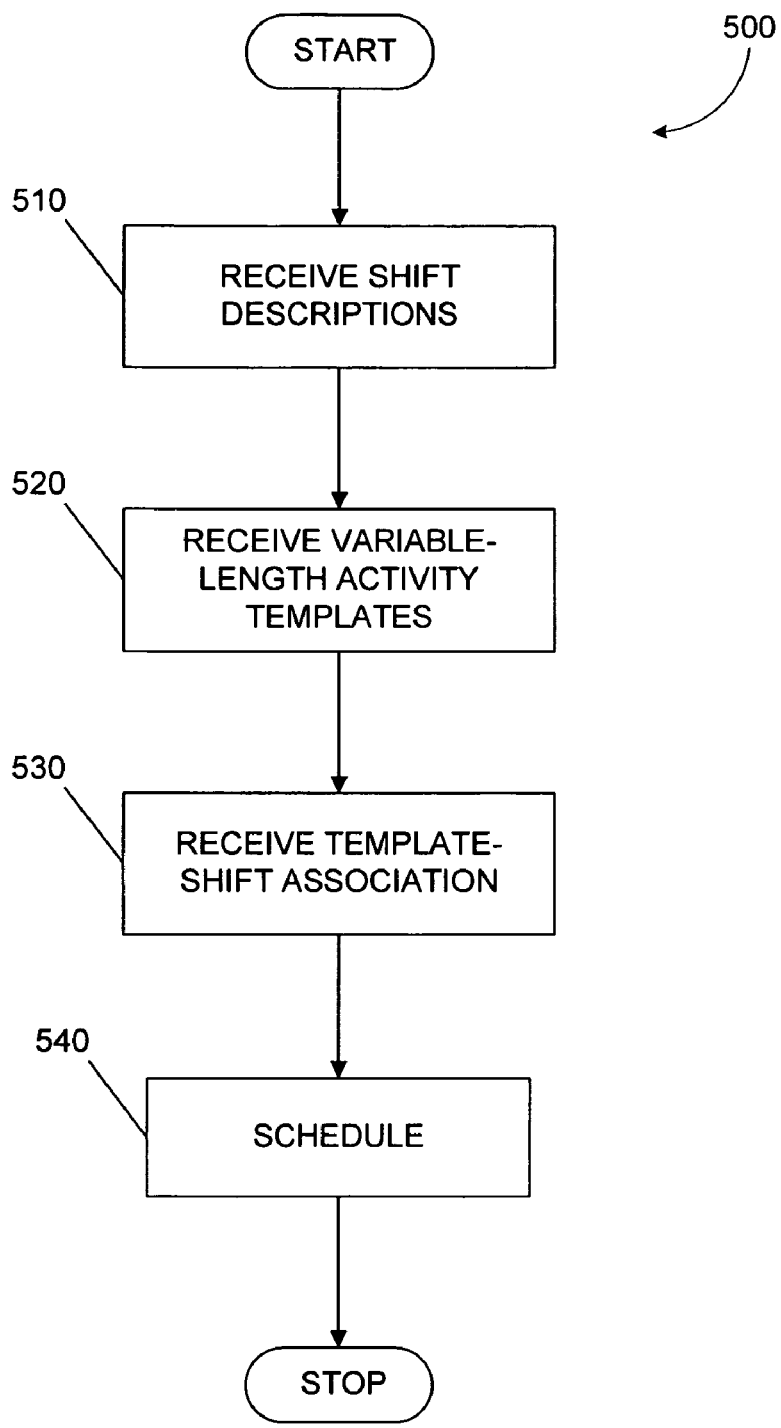
FIG. 5 is a flowchart for one embodiment of a method for automatic scheduling of a workforce.

FIG. 5 is a flowchart for one embodiment of a method (500) for automatic scheduling of a workforce. At block 510, one or more shift descriptions (320) are received. Next (block 520), one or more variable-length activity templates (230) are received. At block 530, at least one association between variable-length activity templates 230 and shift 320 is received. At block 540, schedule 250 is produced based on the received information, in accordance with constraints 280 and goals 260. As will be described in further detail in connection with FIGS. 6-7, schedule 250 is determined by generating schedulable objects and then selecting optimal bindings for these objects.

Figure 6:
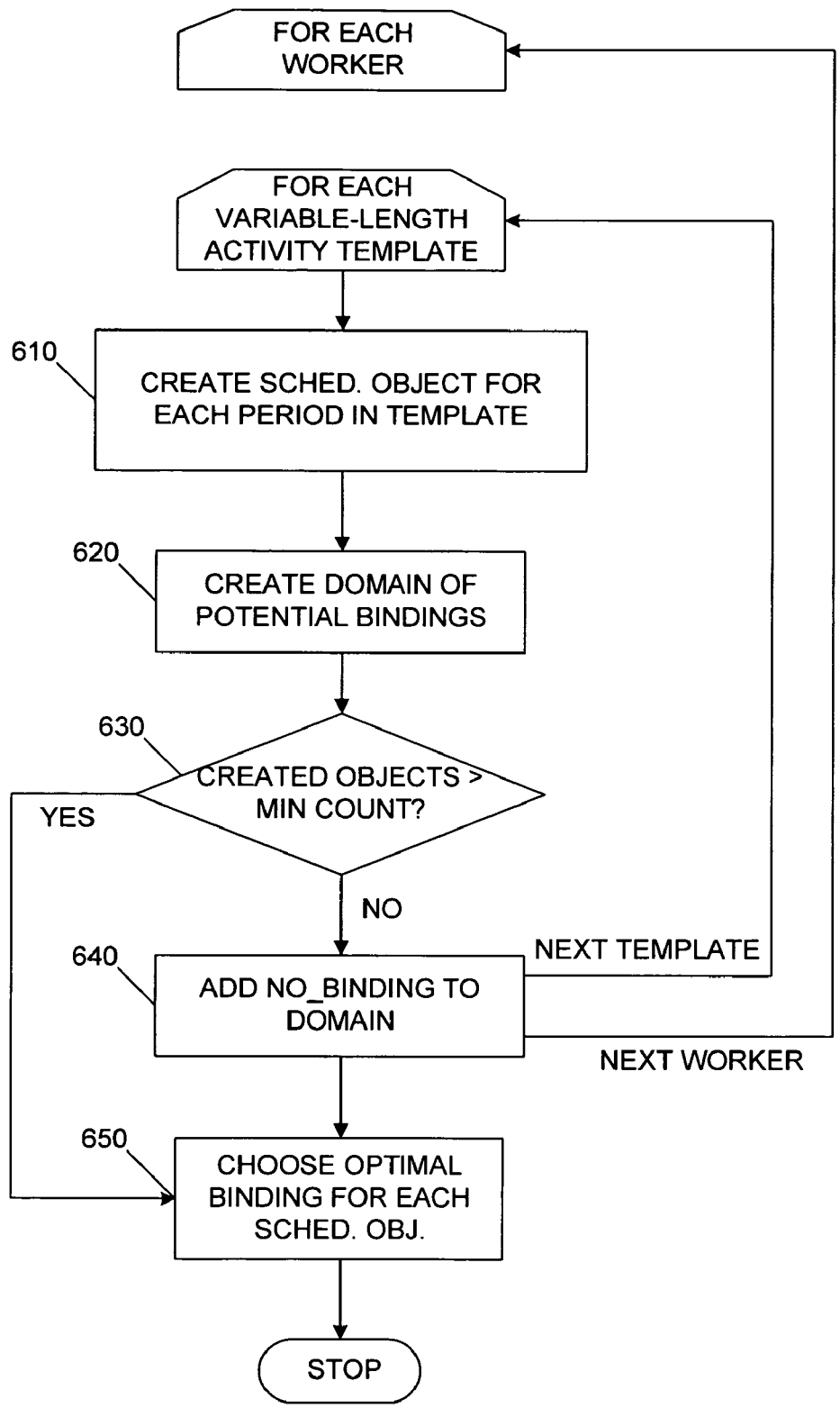
FIG. 6 is a flowchart for one embodiment of scheduler (FIG. 2) for variable-length activities.

FIG. 6 is a flowchart for one embodiment of scheduler 240 that supports automatic scheduling of a workforce. The processing iterates through an outer loop for each worker 310, and an inner loop for each variable-length activity template 230. At block 610, schedulable objects 350 are created from the current variable-length activity template 230 associated with the current worker 310. One object 350 is created for every period 450 in the template 230, which is either given directly by count 460, or is derived as duration (470) divided by period (450).

Figure 7A:
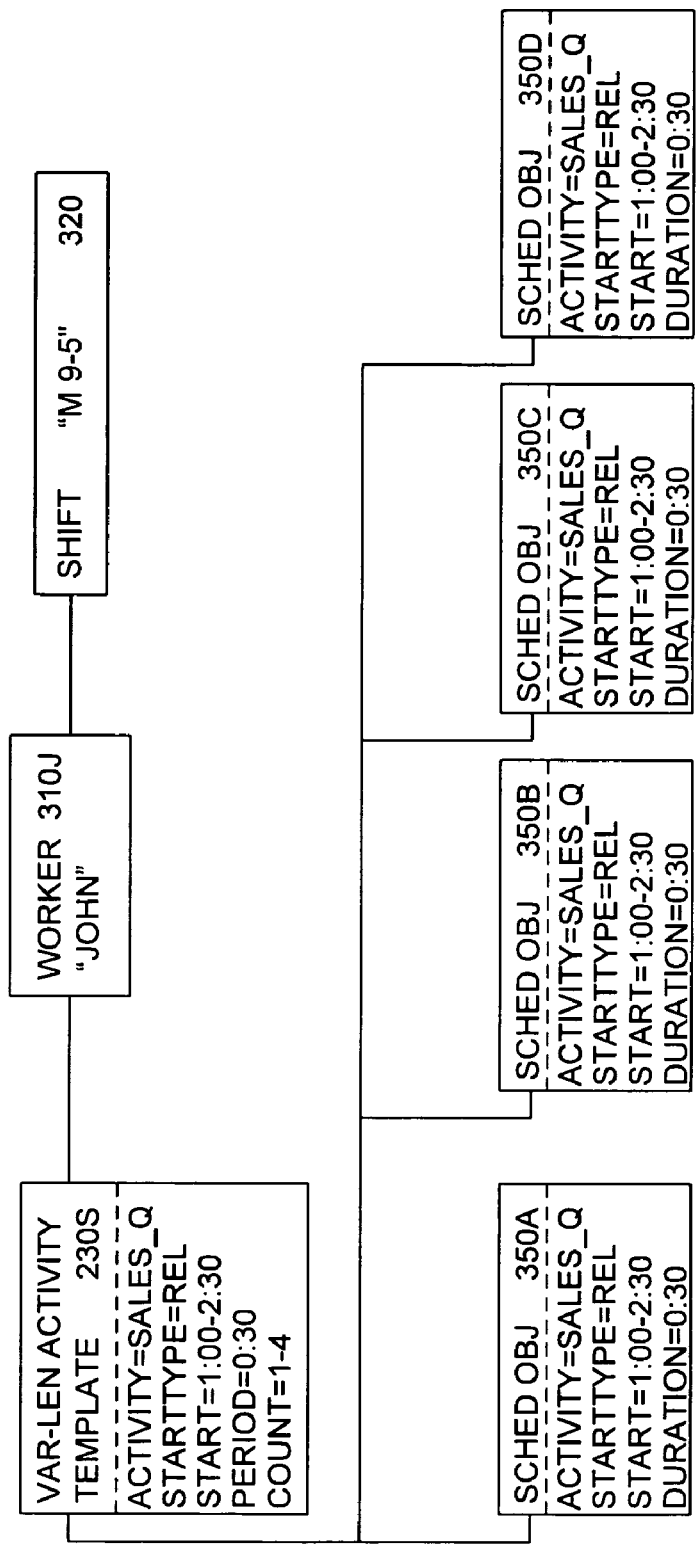
FIGS. 7A and 7B are dataflow diagrams of an example scenario in which variable-length activities are scheduled.
Figure 7B:
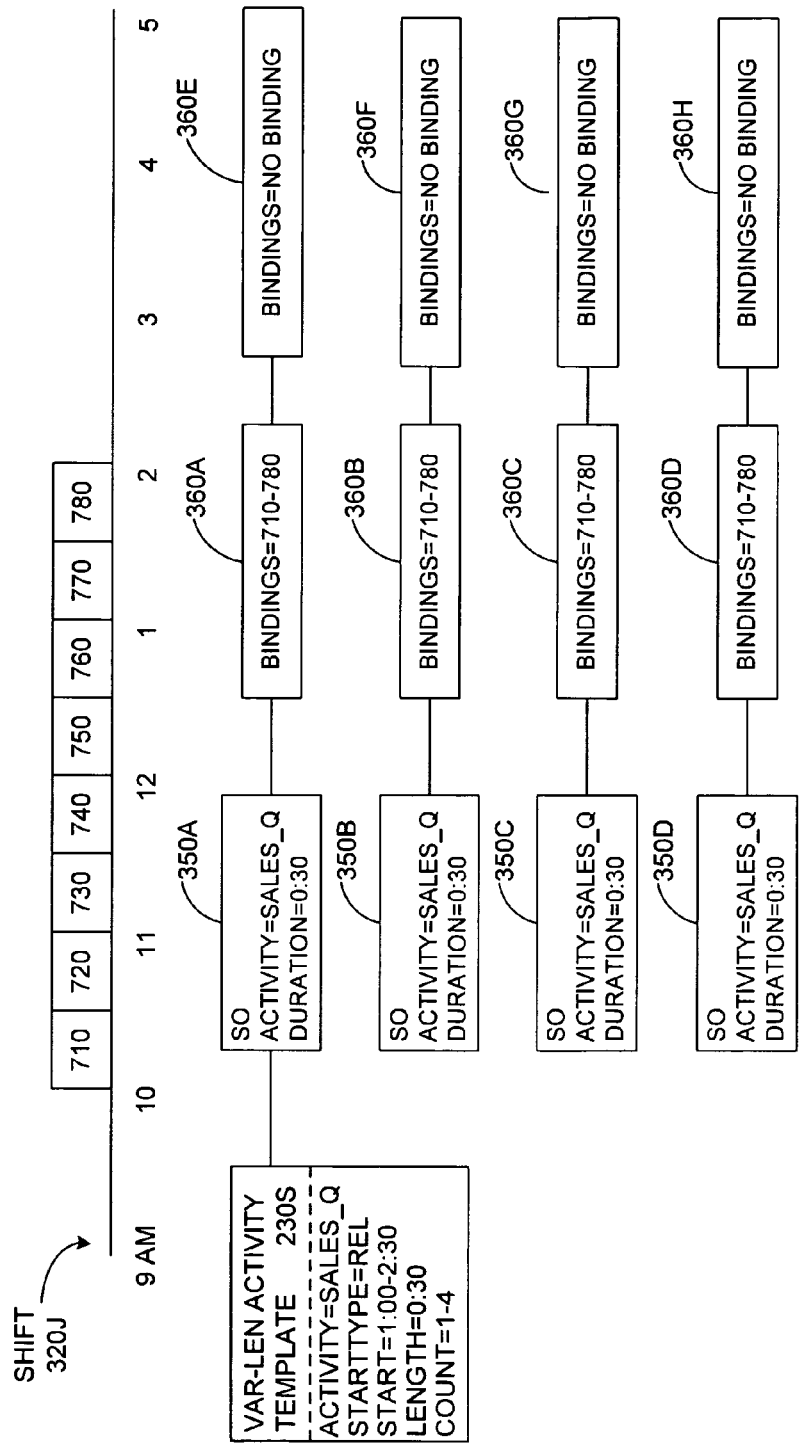

The creation of schedulable objects 350 from variable-length activity template 230 can be seen in the example scenario illustrated in FIGS. 7A and 7B. In this example scenario, as shown in FIG. 7A, schedule 250 includes a single shift 320J ("Monday 9 AM-5 PM"). A worker 310J ("John") is associated with this shift 320J and with a variable-length activity template 230S ("Sales_Q").

From variable-length activity template 230SS, scheduler 240 creates a set of schedulable objects 350 associated with the template. In this example, the template-shift association is indirect, through a template-worker relationship and a worker-shift relationship. Other embodiments are also contemplated, for example a direct association between template and shift, or another indirect relationship such as template-worker, worker-shift, and shift-day.

The number of objects 350 created is equal to the number of periods in an activity of maximum length. In this scenario, variable-length activity template 230S uses the more flexible mechanism to define total activity length, using period 450 and count 460 rather than period 450 and duration 470. Thus, the number of periods is given directly by count 460 in the template. When the alternative mechanism of period 450 and duration 470 is used, the number of periods is equal to maximum duration divided by period length.

The activity attributes of the schedulable objects 350A-D is derived from the corresponding attribute in variable-length activity template 230. The duration of each object 350 is equal to the period 450 specified in the template. Thus in this example scenario there are four schedulable objects (350A-D) each having a "Sales_Q" activity and a duration of 0:30.

Returning to the flowchart in FIG. 6, after schedulable objects are created in block 610, processing continues at block 620, where a set, or domain, of potential bindings is created for the just-created schedulable objects 350. The bindings 360 in the domain are based on shift attributes such as start time and length/end time, and template attributes such as start type and start time range. Creation of bindings 360 will now be discussed in connection with FIG. 7B.

A schedulable object 350 is associated with a shift 320, which has a start time and an end time. Bindings 360 correspond to time slots within a shift that can be assigned to an activity. In the example scenario of FIG. 7B, there are seven half-hour time slots (710-780) between 10:00 AM and 2:00 PM. The attributes of variable-length activity template 230S, in combination with shift 320J, dictate that the bindings 360 start as early as the 10:00 AM time slot (710), since the shift start time is 9:00 AM, the template start time range is 1:00, and the template start type attribute is Relative. The template and shift attributes also dictate that the latest binding is the 1 PM time slot (780), corresponding to a maximum duration shift activity (2:00, or 4*0:30) starting at the latest time possible (11:30).

In this example, total activity length is defined using period 450 and count 460 (rather than period 450 and duration 470). Therefore, the set of bindings (360A-D) for each object (350A-D) is the same, and comprises consecutive slots 710-780. Although the slots are consecutive, the binding for each object is independent of the others: slot 710 can be selected as the optimal binding for 350A, and slot 730 can be selected as the optimal binding for 350B.

Bindings for another embodiment, which defines total activity length using period 450 and duration 470, are created as follows. As explained above, such an activity has a flexible length, but should fill consecutive time slots. In this embodiment, bindings for a later object are dependent on previously created objects. On creation of the first schedulable object 350 (block 610), the bindings 360 for that object are set (block 620) to include all consecutive time slots (in this scenario, slots 710-780). An optimal binding 360 is selected for that first object 350 in block 650. Bindings 360 for each subsequently created objects 360 are constrained to be adjacent to the objects for which a binding has been selected.

Returning to the flowchart in FIG. 6, after schedulable objects 350 and bindings 360 are created in blocks 610 and 620, processing continues at block 630, where the number of objects created is compared to the minimum for count 460 in the current template 230. If the number of created objects is more than the minimum, then at block 640 an additional binding 360, representing No_Binding, is added to the domain of each object that is not required to fulfill the minimum count. For example, if the minimum is 2 and the maximum is 5, then of the 5 created objects, No_Binding is added to the domain of 3 of the objects, but not to the other 2 objects. In the scenario of FIG. 7B, schedulable objects 350A-D each include a binding representing No_Binding (360E-F, respectively).

Creation of schedulable objects 350 and bindings 360 in blocks 610-630 (and in some cases, block 640) is repeated for each template 230, and then for each worker 310. Thus, when block 650 is reached, objects and bindings have been created for all variable-length activity templates 230 associated with all workers 310.

At block 650 the optimal binding 360 for each of the schedulable objects 350 is selected. The techniques that schedulers use to produce an optimal schedule for a given set of inputs (workload, constraints, and goals) should be understood by a person of ordinary skill in the art. Such techniques include, but are not limited to, local search, simulated annealing, and heuristics. The use of schedulable objects and bindings should also be understood by such a person.

Functions of the work force management system (WFMS) 190 related to scheduling variable-length activities have now been described in connection with FIGS. 1-7. Another function of a typical WFMS 190 is to determine how well each agent complies with ("adheres to") contact center policies, and to supply the contact center supervisor with information on this compliance. This function is commonly known as "adherence." An instance where an agent activity does not adhere to a policy is an "exception."

Figure 8:
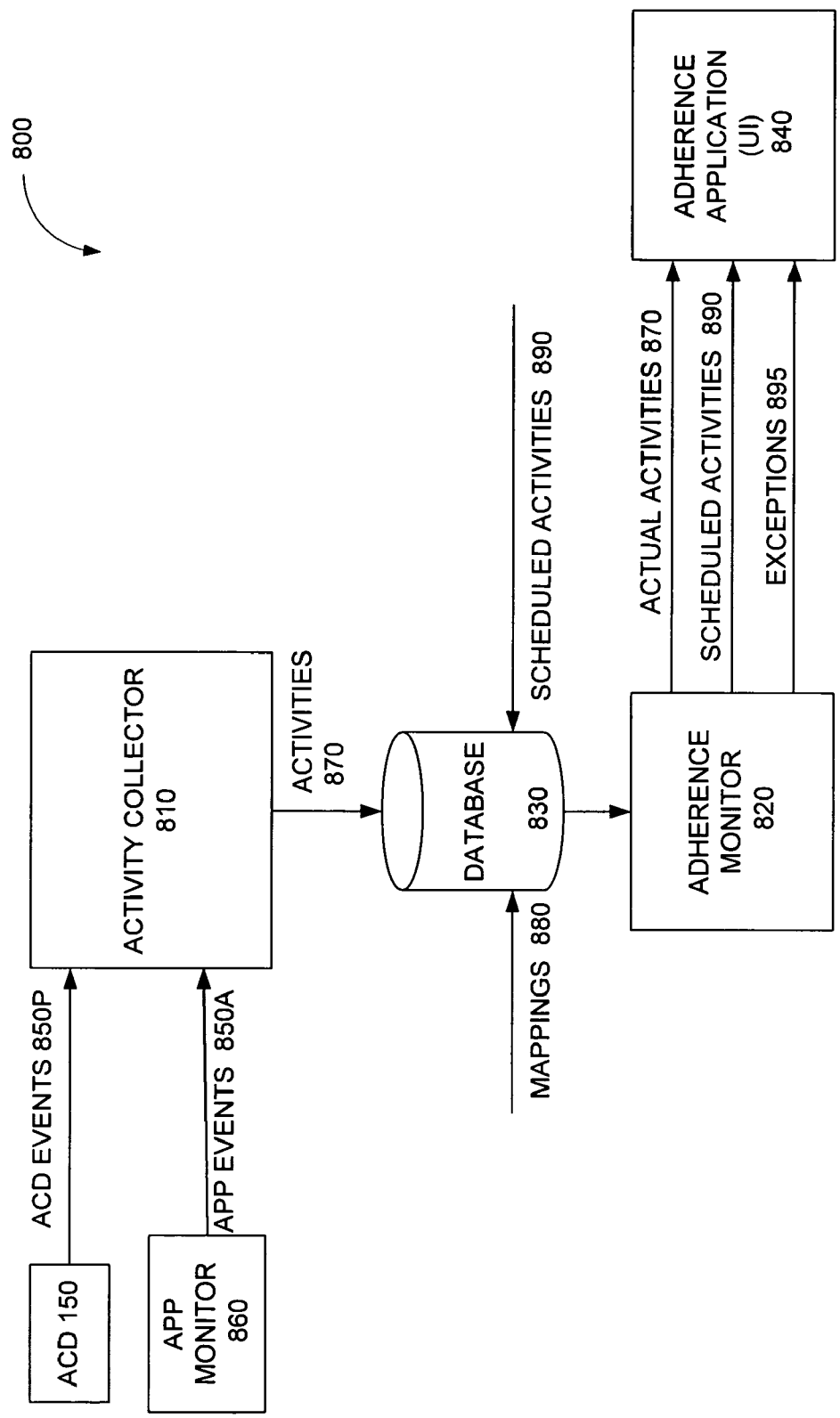
FIG. 8 is a block diagram showing one embodiment of an adherence subsystem in the WFMS (FIG. 1).

FIG. 8 is a block diagram showing one embodiment of an adherence subsystem 800 in the WFMS 190. In adherence subsystem 800, policies are defined in terms of scheduled activities, where these scheduled activities correspond to tasks performed by agents during a workday. Adherence is then determined by comparing the activities actually performed by agents with the activities scheduled to be performed by the agents. The adherence subsystem 800 includes an activity collector 810, an adherence monitor component 820, an adherence database 830, and an adherence application 840 (including a user interface).

Activity collector 810 obtains agent events 850 from various data sources. As the agent takes calls throughout the day, the ACD 150 reports changes in the state of the agent's phone as ACD events 850P. (In some environments, the events may be Computer Telephony Integration (CTI) events instead of ACD events). As an agent interacts with various applications 180 on his workstation 120, an application monitor 860 reports application events 850A.

Events are mapped into agent activities 870, using activity mapping definitions 880 provided by a user. In some embodiments, each data source has one event-to-activity mapping. In other embodiments, data sources can include sub-sources. A sub-source can have its own event-to-activity mapping, or can inherit the mapping of the parent source.

Example mappings might be:
ACD_Avail|ACD_Busy|ACD_AfterCallWork|ACD_Hold=Activity_Phone
ACD_LoggedOut=Activity_Break
PC_Outlook=Activity_Email
PC_InstantMessenger=Activity_Chat
PC_FaxApp=Activity_Fax These collected agent activities 870 are "actual" activities which have actually occurred. In contrast, a scheduled activity is scheduled to occur, and may or may not have actually occurred. A manager or supervisor defines scheduled activities (890) through a WFM application (not shown). As explained above, scheduled activities 890 correspond to tasks performed by agents during a workday (e.g., Phone, E-mail, Chat, Fax, Out).

Both types of activities (870, 890) are stored in the adherence database 830. In one implementation, the activity information stored in adherence database 830 includes an agent identifier; an activity code; a start time; and a duration. In another implementation, the activity information stored in adherence database 830 includes: an agent identifier; an activity code; a start time; and a stop time.

The adherence monitor 820 retrieves actual activities 870 and scheduled activities 890 and compares them on a per-agent basis. If the comparison reveals a discrepancy between an actual activity 870 and a scheduled activity 890 for the same agent, the adherence monitor 820 notes this as an exception 895. However, the comparison may take into account a guard time for a scheduled activity 890. For example, a policy could be defined to allow an agent to log into the ACD two minutes early, or one minute late, without reporting the activity as out of adherence.

The adherence monitor 820 provides information to the adherence application 840 about the scheduled activities 890, the actual activities 870, and exceptions 895. The adherence application 840 uses this information to display several timelines, including a scheduled timeline, an actual timeline, and an adherence exception timeline.

The adherence subsystem 800 described above represents only one example of how functionality can be partitioned between components in an adherence subsystem. One of ordinary skill in the art should understand that other partitions are possible. As just one example, another variation of the adherence database 830 stores device events rather than actual activities in the adherence database 830, and the mapping from events to actual activities is performed by the adherence monitor 820 rather than the activity collector 810. Furthermore, one of ordinary skill in the art should recognize that the "timeline" produced by the adherence monitor 820 is not required to be a graphical representation, but can be any data structure which conveys the underlying information about activities and occurrence times.

Figure 9:
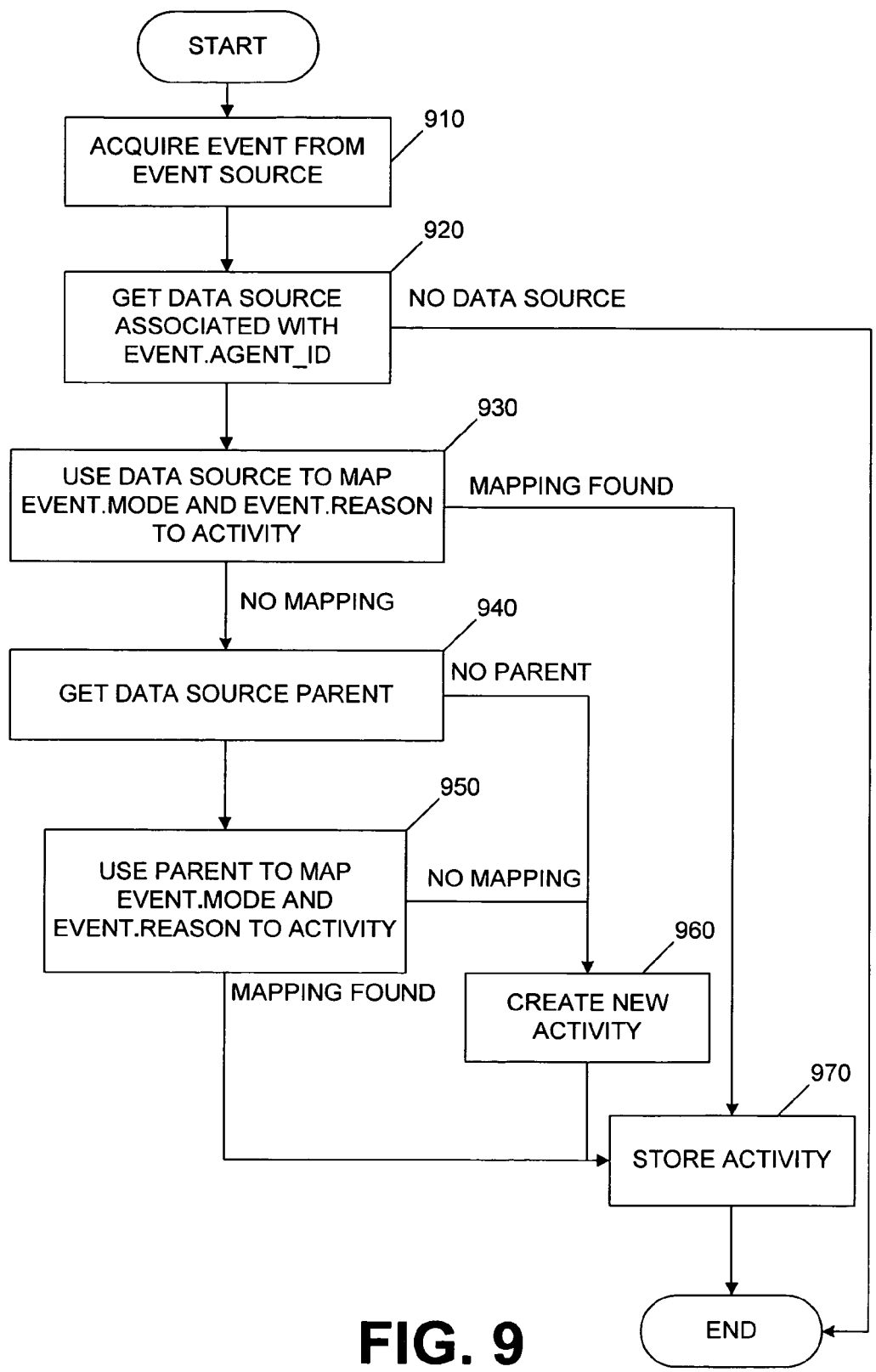
FIG. 9 is a flowchart of a method for mapping events using data sources and sub-sources, in accordance with one embodiment of activity collector (FIG. 8).

FIG. 9 is a flowchart of a method for mapping events using data sources and sub-sources, in accordance with one embodiment of activity collector 810. At block 910, an event is acquired from an event source, for example, ACD 150 or application monitor 860. The event data includes an agent identifier, an event descriptor, and a time. Next, at block 920, the data source associated with the agent identifier is obtained. If the agent identifier has no associated data source, then processing ends. Otherwise, the event is mapped (block 930) to an activity using a data-source specific mapping. In one embodiment, the event descriptor includes a mode and a reason, and this pair is used to map to an event. If a mapping for the event is found, processing continues at block 970, where the activity is stored, and processing then ends.

If no mapping is found, processing continues instead at block 940, where the parent source is obtained for the data source associated with the event agent identifier. If a parent source is found, processing continues at block 950, where a mapping specific to the parent data source is used to map the event to an activity. Processing continues at block 970, where the activity is stored.

If no parent source is found in block 940, or if no parent-specific mapping is found in block 950, then block 960 creates a new event descriptor. The user can later view these "unmapped" event descriptors and map them to an Activity.

Having a hierarchy of data sources and sub-data sources, and the event-to-activity mappings associated with each, is useful for queue hopping. Although a sub-data source is typically the same physical data source as the parent, the hierarchy allows events to be grouped in a logical manner. In an embodiment where the ACD is seen as a single, non-hierarchical, data source, all ACD_Busy events for the same agent map to the same activity (e.g., Activity_Phone), even when the agent is assigned to different queues. With the embodiment of FIG. 9, a contact center can handle queue hopping by creating several queue-specific data sub-sources, and different activities for each. Thus, an ACD_Busy while logged in to Queue #1 can produce a Q1_Phone activity and ACD_Busy while logged in to Queue #2 can produce a Q2_Phone activity.

In the embodiments described herein, there is no direct use of a queue in mapping from a data source to an activity. Instead, a flexible activity is associated with a queue (described above in connection with FIGS. 3 and 4), and a queue is associated with a data source (through WFMS 190.) In one embodiment, an error message is presented if the mapping from a data source associated with queue X maps to an activity associated with queue Y.

Figure 10:
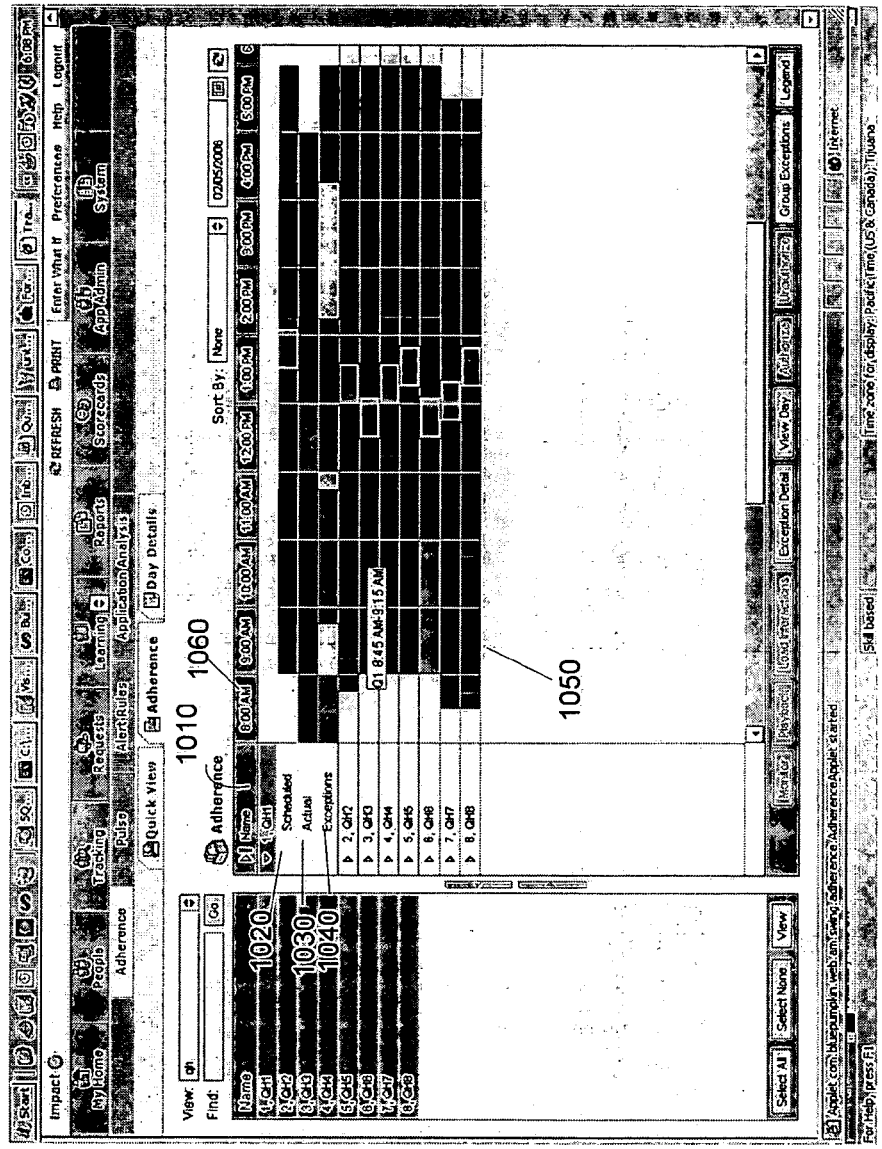
FIG. 10 illustrates an embodiment of adherence application (FIG. 8) that includes queue hopping.

Conventional agent activity tracking and agent adherence applications do not handle queue hopping well, because agent activity is not conventionally tracked specifically for each queue. The use of event-to-activity mappings that are specific to a queue, as described in FIG. 9, does allow agent activity and adherence to be tracked in a queue hopping environment. FIG. 10 illustrates an embodiment of adherence application 840 that supports queue hopping. An adherence window 1000 presents a timeline view of exceptions to adherence for a list of agents (1010) during a specified time period. For each agent, one line (1020) shows the agent's schedule, another line (1030) shows the agent's actual activity, and another line (1040) shows activities that are adherence exceptions.

Blocks 1050 indicate periods of agent activity (actual or scheduled), occurring at specific times and for specific durations. The location of an activity block 350 is aligned with the timeline axis 360 to show this time and duration. Each activity on these three lines is aligned appropriately with a timeline axis 1060 (e.g., an activity starting at 5:00 PM and ending at 5:30 PM would have its left edge aligned with the 5:00 PM marker on the timeline axis 360).

Each different type of activity (e.g., Phone, LoggedOut) is displayed with a different visual attribute (e.g., color, pattern, shading). The combination of timeline alignment and color-coded activities allows a user to quickly get an overall picture of what an agent is spending his time on in a given time period. A legend may be included to show which color/pattern/shade corresponds to each of these types.

Actual activity line 1020 includes time periods during which an agent performed a flexible activity, such as queue hopping. (Flexible activities were discussed earlier in connection with FIGS. 2-7.) Actual activities of agents that are assigned to flexible, queue-specific activities are tracked as described in connection with FIGS. 8-9, and displayed as shown on line 1020. In contrast, without tracking of queue-specific activities, the actual activity line 1020 would be limited to a display showing longer blocks of activities such as OnPhone or ReadyForCall, but could not show that during a 30 minute OnPhone activity, the agent actually serviced Queue1 for three different 5-minute periods, and Queue2 for a 10 minute and a 5-minute period.

Figure 11:
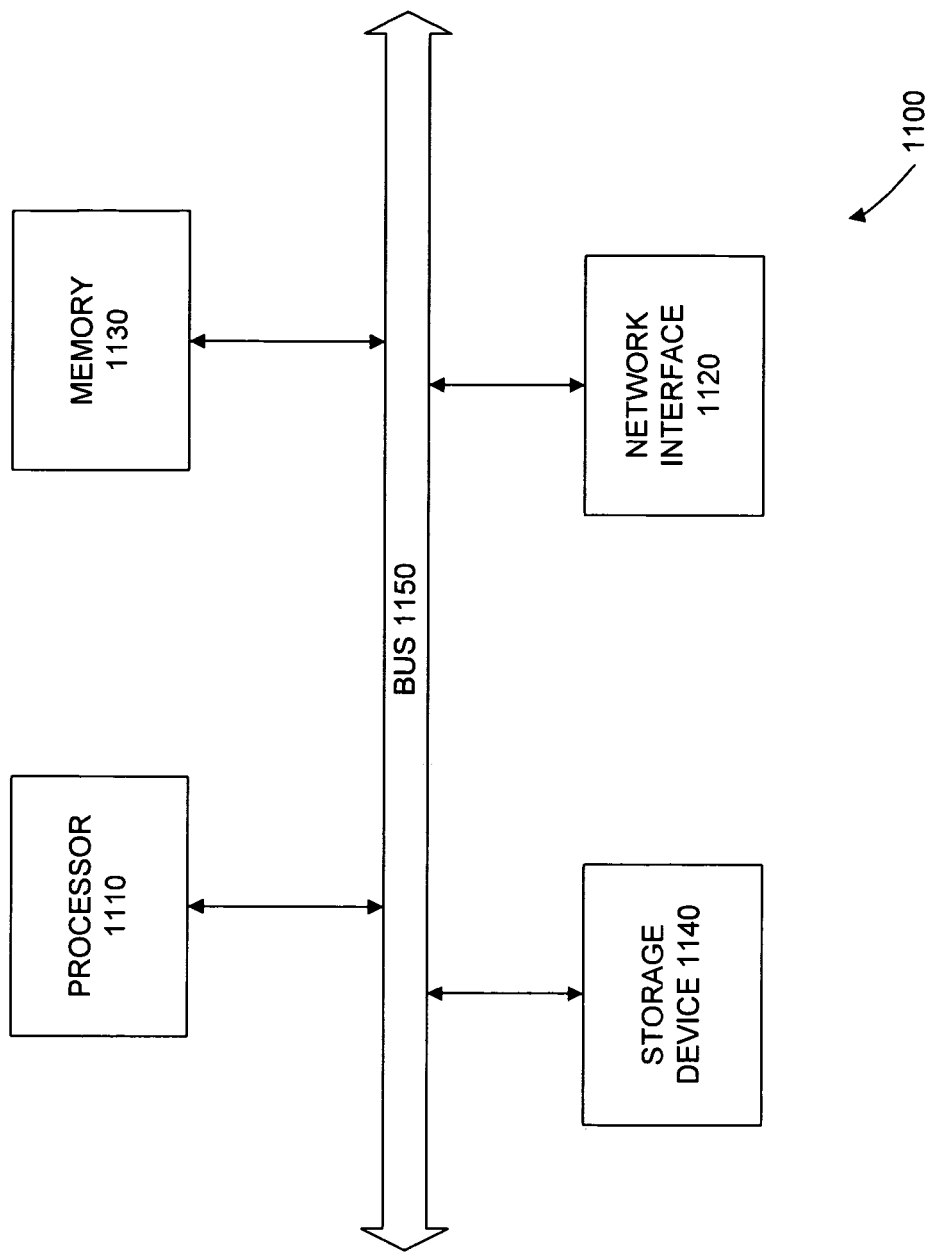
FIG. 11 is a hardware block diagram of a general-purpose computer which can be used to implement various embodiments of systems and methods for automatic scheduling of a workforce.

FIG. 11 is a hardware block diagram of a general-purpose computer 1100 which can be used to implement various embodiments of systems and methods for automatic scheduling of a workforce. Computer 1100 contains a number of components that are well known in the art of contact center software, including a processor 1110, a network interface 1120, memory 1130, and storage device 1140. Examples of storage device 1140 include, for example, a hard disk, flash RAM, flash ROM, and EEPROM. These components are coupled via a bus 1150. Memory 1130 contains instructions which, when executed by the processor 1110, implement systems and methods for automatic scheduling of a workforce, such as the processes depicted in the diagrams of FIGS. 1-10. Omitted from FIG. 11 are a number of conventional components that are unnecessary to explain the operation of computer 1100.

The systems and methods for automatic scheduling of a workforce can be implemented in software, hardware, or a combination thereof. In some embodiments, the system and/or method is implemented in software that is stored in a memory and that is executed by a suitable microprocessor (µP) situated in a computing device. However, the systems and methods can be embodied in any computer-readable medium for use by or in connection with an instruction execution system, apparatus, or device. Such instruction execution systems include any computer-based system, processor-containing system, or other system that can fetch and execute the instructions from the instruction execution system. In the context of this disclosure, a "computer-readable medium" can be any means that can contain or store the program for use by, or in connection with, the instruction execution system. The computer readable medium can be, for example but not limited to, a system that is based on electronic, magnetic, optical, electromagnetic, or semiconductor technology.

Specific examples of a computer-readable medium using electronic technology would include (but are not limited to) the following: a random access memory (RAM); a read-only memory (ROM); an erasable programmable read-only memory (EPROM or Flash memory). A specific example using magnetic technology includes (but is not limited to) a portable computer diskette. Specific examples using optical technology include (but are not limited to): a portable compact disk read-only memory (CD-ROM). In addition, the functionality could be implemented in logic embodied in hardware or software-configured media.

Any process descriptions or blocks in flowcharts should be understood as representing modules, segments, or portions of code which include one or more executable instructions for implementing specific logical functions or steps in the process. As would be understood by those of ordinary skill in the art of the software development, alternate embodiments are also included within the scope of the disclosure. In these alternate embodiments, functions may be executed out of order from that shown or discussed, including substantially concurrently or in reverse order, depending on the functionality involved.

This description has been presented for purposes of illustration and description. It is not intended to be exhaustive or to limit the disclosure to the precise forms disclosed. Obvious modifications or variations are possible in light of the above teachings. The embodiments discussed, however, were chosen to illustrate the principles of the disclosure, and its practical application. The disclosure is thus intended to enable one of ordinary skill in the art to use the disclosure, in various embodiments and with various modifications, as are suited to the particular use contemplated. All such modifications and variation are within the scope of this disclosure, as determined by the appended claims when interpreted in accordance with the breadth to which they are fairly and legally entitled.

We claim:

1. A method of workforce scheduling, comprising the steps of:
    in an instruction execution system, receiving a shift activity template describing a worker activity performed during a shift, the template comprising a range of start times, a start type, and a variable length for the activity, wherein the shift activity template defines the variable length using a period attribute and a count attribute, wherein the period attribute is a length of time and the count attribute is a range representing a number of periods available for scheduling, the activity being associated with a queue;
    in the instruction execution system, receiving an association between the shift activity template and at least one worker;
    in the instruction execution system, creating a plurality of schedulable objects from the shift activity template based on the period attribute and the count attribute, wherein each of the schedulable objects comprises a length equal to the length of time of the period attribute and the number of the schedulable objects created is equal to the highest value of the range of the count attribute;
    in the instruction execution system, creating a plurality of potential bindings for each of the schedulable objects based on a plurality of available timeslots within the shift, the range of start times, and the start type;
    in the instruction execution system, selecting a first one of the potential bindings for association with a first one of the schedulable objects in accordance with a workload forecast and schedule constraints; and
    in the instruction execution system, producing a schedule by applying the first one of the potential bindings to the first one of the schedulable objects.

2. The method of claim 1, wherein the start type is relative, which indicates the range of start times are relative to a start time of the shift associated with the template.

3. The method of claim 1, wherein the start type is absolute, which indicates the range of start times are actual start times for use when creating the plurality of potential bindings.

4. The method of claim 1, wherein the start type is relative, the shift comprises a start time, and the start time of the shift is modified by one of the start times of the range of start times.

5. The method of claim 1, wherein the schedule comprises the activity scheduled as non-consecutive blocks within the shift.

6. The method of claim 1, further comprising:
    selecting a second one of the potential bindings for association with a second one of the schedulable objects in accordance with the workload forecast and the schedule constraints; and
    producing the schedule by applying the second one of the potential bindings to the second one of the schedulable objects, wherein the second one of the potential bindings is applied independent of the first one of the potential bindings.

7. A computer implemented system of scheduling a workforce comprising:
a user interface operative to receive a shift activity template describing a worker activity performed during a shift and to receive an association between the shift activity template and at least one worker, the template comprising a range of start times, a start type, and a variable length for the activity, wherein the shift activity template defines the variable length using a period attribute and a count attribute, wherein the period attribute is a length of time and the count attribute is a range representing a number of periods available for scheduling, the activity being associated with a queue; and
a scheduler operative to create a plurality of schedulable objects from the shift activity template based on the period attribute and the count attribute, wherein each of the schedulable objects comprises a length equal to the length of time of the period attribute and the number of the schedulable objects created is equal to the highest value of the range of the count attribute, create a plurality of potential bindings for each of the schedulable objects based on a plurality of available timeslots within the shift, the range of start times, and the start type, select a first one of the potential bindings for association with a first one of the schedulable objects in accordance with a workload forecast and schedule constraints, and produce a schedule by applying the first one of the potential bindings to the first one of the schedulable objects.

8. The system of claim 7, wherein the
start type is relative, which indicates the range of start times are relative to a start time of the shift associated with the template.

9. The system of claim 7, wherein the start type is relative, the shift comprises a start time, and the start time of the shift is modified by one of the start times of the range of start times.

10. The system of claim 7, wherein the schedule comprises the activity scheduled as non-consecutive blocks within the shift.

11. The system of claim 7, further comprising an activity collector, the activity collector comprising:
logic for receiving an agent event from a data sub-source, the data sub-source associated with a parent data source; and
logic for mapping the event to one of a plurality of agent activities through a mapping definition associated with the data sub-source.

12. The system of claim 7, further comprising:
logic for receiving a plurality of agent events from a plurality of data sub-sources, each of the agent events associated with the same agent, each of the data sub-sources specific to a queue and associated with a parent data source; and
logic for mapping the event to one of a plurality of agent activities through a mapping definition associated with the data sub-source; and
an agent activity tracking view configured to display the agent activities in conjunction with a timeline, wherein each of the agent activities is associated with a different queue.

13. The system of claim 11, wherein the activity collector further comprises:
logic for mapping the event to one of the agent activities through a mapping definition associated with a parent of the data sub-source if no mapping is associated with the data sub-source.

14. The system of claim 13, wherein the activity collector further comprises:
logic for creating a new event if the data sub-source has no parent or if no mapping is associated with a parent of the data sub-source.

15. A computer-readable medium having a computer program stored thereon, the computer program comprising computer-executable instructions for performing a computer-executed method for scheduling a workforce in a contact center, the method comprising the steps of:
receiving a shift activity template describing a worker activity performed during a shift, the template comprising a range of start times, a start type, and a variable length for the activity, wherein the shift activity template defines the variable length using a period attribute and a count attribute, wherein the period attribute is a length of time and the count attribute is a range representing a number of periods available for scheduling, the activity being associated with a queue;
receiving an association between the shift activity template and at least one worker;
creating a plurality of schedulable objects from the shift activity template based on the period attribute and the count attribute, wherein each of the schedulable objects comprises a length equal to the length of time of the period attribute and the number of the schedulable objects created is equal to the highest value of the range of the count attribute;
creating a plurality of potential bindings for each of the schedulable objects based on a plurality of available timeslots within the shift, the range of start times, and the start type;
selecting a first one of the potential bindings for association with a first one of the schedulable objects in accordance with a workload forecast and schedule constraints; and
producing a schedule by applying the first one of the potential bindings to the first one of the schedulable objects.

16. The computer-readable medium of claim 15, wherein the start type is relative, which indicates the range of start times are relative to a start time of the shift associated with the template.

17. The computer-readable medium of claim 15, wherein the start type is relative, the shift comprises a start time, and the start time of the shift is modified by one of the start times of the range of start times.

18. The computer-readable medium of claim 17, wherein the schedule comprises the activity scheduled as non-consecutive blocks within the shift.

19. The computer-readable medium of claim 17, wherein the bindings correspond to adjacent timeslots.

20. The computer-readable medium of claim 17, wherein the bindings correspond to non-adjacent timeslots.

* * * * *